United States Patent
Wang et al.

(10) Patent No.: US 10,628,924 B2
(45) Date of Patent: Apr. 21, 2020

(54) METHOD AND DEVICE FOR DEBLURRING OUT-OF-FOCUS BLURRED IMAGES

(71) Applicant: Peking University Shenzhen Graduate School, Shenzhen (CN)

(72) Inventors: Ronggang Wang, Shenzhen (CN); Xinxin Zhang, Shenzhen (CN); Zhenyu Wang, Shenzhen (CN); Wen Gao, Shenzhen (CN)

(73) Assignee: Peking University Shenzhen Graduate School, Shenzhen (CN)

( * ) Notice: Subject to any disclaimer, the term of this patent is extended or adjusted under 35 U.S.C. 154(b) by 120 days.

(21) Appl. No.: 15/753,971

(22) PCT Filed: Dec. 14, 2015

(86) PCT No.: PCT/CN2015/097237
§ 371 (c)(1),
(2) Date: Feb. 20, 2018

(87) PCT Pub. No.: WO2017/100971
PCT Pub. Date: Jun. 22, 2017

(65) Prior Publication Data
US 2018/0276796 A1 Sep. 27, 2018

(51) Int. Cl.
*G06K 9/40* (2006.01)
*G06T 5/00* (2006.01)
(Continued)

(52) U.S. Cl.
CPC ............ *G06T 5/003* (2013.01); *G06F 17/15* (2013.01); *G06T 5/20* (2013.01); *G06T 7/13* (2017.01);
(Continued)

(58) Field of Classification Search
CPC ........... G06T 5/00; G06T 5/001; G06T 5/002; G06T 5/003; G06T 5/004; G06T 5/20;
(Continued)

(56) References Cited

U.S. PATENT DOCUMENTS 7,551,772 B2 * 6/2009 Lim ........................ G06T 5/003
382/162
7,561,186 B2 * 7/2009 Poon ....................... G06T 5/004
382/255
(Continued)

OTHER PUBLICATIONS

Shaojie Zhuo and Terence Sim, "Defocus map estimation from a single image", Elsevier, Pattern Recognition, vol. 44, Issue 9, Sep. 2011, pp. 1852-1858 (Year: 2011).*
(Continued)

*Primary Examiner* — Eric Rush
(74) *Attorney, Agent, or Firm* — SV Patent Service

(57) ABSTRACT

Method and device for deblurring an out-of-focus blurred image: first, a preset blur kernel is used to carry out blurring processing on an original image to obtain a re-blurred image. Blur amounts of pixels in an edge area of the original image are estimated according to the change of the image edge information in the blurring processing to obtain a sparse blur amount diagram. Blur amounts of pixels in a non-edge area of the original image are estimated according to the sparse blur amount diagram to obtain a complete blur amount diagram. Deblurring processing is carried out according to the complete blur amount diagram to obtain a deblurred image. In the method and device provided, since a blur amount diagram is obtained based on the change of edge information after image blurring, the blur amount diagram can be more accurate, so that the quality of a deblurred image is improved.

20 Claims, 4 Drawing Sheets

(51) Int. Cl.
*H04N 1/409* (2006.01)
*G06T 7/13* (2017.01)
*G06F 17/15* (2006.01)
*G06T 5/20* (2006.01)

(52) U.S. Cl.
CPC ........... *H04N 1/409* (2013.01); *H04N 1/4092* (2013.01); *G06T 2207/20012* (2013.01)

(58) Field of Classification Search
CPC .... G06T 5/50; G06T 7/10; G06T 7/12; G06T 7/13; G06T 2207/20012; G06T 2207/20172; G06T 2207/20192; G06T 2207/20201; G06T 2207/20212; G06T 2207/20216; G06T 2207/20221; G06F 17/15; H04N 1/40093; H04N 1/409; H04N 1/4092; H04N 1/58
USPC ............... 382/100, 195, 199, 254, 255, 260, 382/263–266, 276; 348/606, 607, 625
See application file for complete search history.

(56) References Cited

U.S. PATENT DOCUMENTS

| | | | | |
|---|---|---|---|---|
| 8,249,377 B1* | 8/2012 | Banner | ...................... | G06T 7/12 382/255 |
| 9,008,453 B2* | 4/2015 | Fattal | ...................... | G06T 5/003 382/255 |
| 9,251,575 B2* | 2/2016 | Tanaka | ...................... | G06T 5/002 |
| 9,665,792 B2* | 5/2017 | Xu | ........................ | G06T 5/003 |
| 2008/0175508 A1* | 7/2008 | Bando | ...................... | G06T 5/003 382/255 |
| 2009/0316995 A1* | 12/2009 | Szeliski | .................. | G06T 5/003 382/199 |
| 2011/0085741 A1* | 4/2011 | Zhang | ...................... | G06T 5/003 382/255 |
| 2013/0071028 A1* | 3/2013 | Schiller | ..................... | G06T 7/11 382/180 |
| 2015/0003725 A1* | 1/2015 | Wan | ........................ | G06T 7/194 382/154 |
| 2016/0371820 A1* | 12/2016 | Hiasa | ...................... | G06T 7/207 |

OTHER PUBLICATIONS

Qifeng Chen, Dingzeyu Li, and Chi-Keung Tang, "KNN Matting", IEEE, Transactions on Pattern Analysis and Machine Intelligence, vol. 35, No. 9, Sep. 2013, pp. 2175-2188 (Year: 2013).*

Rob Fergus, Barun Singh, Aaron Hertzmann, Sam T. Roweis and William T. Freeman, "Removing Camera Shake from a Single Photograph", ACM Transactions on Graphics, vol. 25, Issue 3, Jul. 2006, pp. 787-794 (Year: 2006).*

Futao Pi, Yi Zhang, Gang Lu and Baochuan Pang, "Defocus Blur Estimation from Multi-Scale Gradients", Proc. of SPIE vol. 8783, Fifth International Conference on Machine Vision, Mar. 2013, pp. 1-5 (Year: 2013).*

* cited by examiner

METHOD AND DEVICE FOR DEBLURRING OUT-OF-FOCUS BLURRED IMAGES

TECHNICAL FIELD

The present invention relates to the field of image processing, and specially, to a method and a device for deblurring an out-of-focus blurred image.

BACKGROUND OF THE INVENTION

When taking a photo with a common camera, if the focus is on an object, different degrees of out-of-focus phenomenon may occur in areas that are not at the same depth as the object. According to the thin-lens imaging system model, the degree of out-of-focus is proportional to the depth of the scene. The farther the object is from the focal plane, the greater the blurring degree is. Photographers deliberately take out-of-focus blurred photos to achieve artistic effects, but blurred images lose many details, and sometimes we need to avoid out-of-focus blurring, so debluring processing of a single image is significant.

The degradation (decrease in image quality) model of out-of-focus images can be expressed as the following convolution process:

$$I = L \otimes k + N, \quad (1)$$

where I and L denote an out-of-focus blurred image and a clear image, respectively, $\otimes$ is the convolutional symbol, N is random noise, and k is a blur kernel. In out-of-focus blurring, the blur kernel is often considered as a Gaussian model:

$$k(x, y, \sigma) = \frac{1}{\sqrt{2\pi}\,\sigma} e^{-\frac{x^2+y^2}{2\sigma^2}}, \quad (2)$$

where (x,y) are the coordinates of a pixel in the image, a is the standard deviation, which can measure the blur degree of the image, also known as the blur amount.

The blur kernel estimation is a key step in deblurring processing. For spatially consistent images, since the blur kernels are the same at various locations on the image, deblurring the image in this case is simpler. For spatially variable blurred images, each pixel in the image has a different blur kernel, which is more complicated and deblurring the image is more difficult. At present, there are mainly two methods to estimate the blur kernels of a single spatially variable blurred image: in the first method, the image is divided into rectangular areas of equal size according to the similarities of blur kernels. Spatial sparse constraints are used to constrain the blur kernel in each area to obtain the local blur kernel k of the image. The other method considers the blur kernel as a disc model or a Gaussian model, and estimates the radius of the disc corresponding to each pixel or the standard deviation of the Gaussian model to obtain blur kernels. Since the blur degree in the local area of the image is depth dependent, dividing the image into rectangular areas of equal size easily causes great difference between the actual blur degree of different pixels in the same rectangular area, so the local blur kernel estimation is not accurate in the first method. A corresponding blur kernel for each pixel is obtained in the second method, but it spends too much to deconvolute each pixel by using different blur kernels respectively during image restoration. Therefore, how to use these blur kernels for image restoration is a key issue.

At present, it is proposed to divide the blur amounts a into different orders of magnitude, and take the minimum value of each order as the value of the blur amounts at this order. Ringing artifacts are eliminated in this method (The Ringing artifact is one of the factors that affects the quality of restored image due to using improper model in image restoration. The direct cause of the ringing artifacts is loss of information in the image degradation process, especially the loss of high-frequency information, which seriously degrades the quality of the restored image and it is difficult to carry out subsequent processing of the restored image). However, since the final estimated blur amount is less than the actual one, the restored images are still relatively blurring.

In summary, as a key step in image processing, deblurring a single spatial variable out-of-focus image has drawn much attention and a large number of deblurring algorithms have emerged. However, there are still many problems with the blur kernel estimation and the final image restoration, which requires further improvement.

SUMMARY OF THE INVENTION

The present invention provides a method and a device for deblurring an out-of-focus blurred image, which solves the problem of unsatisfied deblurring processing effect on out-of-focus images in conventional technologies.

According to an aspect of the present invention, the present invention provides a deblurring method for an out-of-focus blurred image, comprising the steps of:

inputting an original image;

using a preset blur kernel to carry out blurring processing on the original image to obtain a re-blurred image;

estimating blur amounts of pixels in an edge area of the original image according to the change of the image edge information in the blurring processing procedure to obtain a sparse blur amount diagram;

estimating the blur amounts of pixels in a non-edge area of the original image according to the sparse blur amount diagram to obtain a complete blur amount diagram; and carrying out deblurring processing according to the complete blur amount diagram to obtain a deblurred image.

According to a further aspect of the present invention, the present invention further provides a deblurring device for an out-of-focus blurred image, comprising:

an input module configured to input an original image;

a sparse blur amount diagram estimation module configured to use a preset blur kernel to carry out blurring processing on the original image to obtain a re-blurred image; and estimating the blur amounts of pixels in an edge area of the original image according to the change of the image edge information in the blurring processing procedure to obtain a sparse blur amount diagram;

a complete blur amount diagram mapping module configured to estimate blur amounts of pixels in a non-edge area of the original image according to the sparse blur amount diagram to obtain a complete blur amount diagram; and a deblurring processing module configured to carry out deblurring processing according to the complete blur amount diagram to obtain a deblurred image.

A method and a device for deblurring an out-of-focus blurred image are provided in the present invention: first using a preset blur kernel to carry out blurring processing on an input original image to obtain a re-blurred image; estimating the blur amounts of pixels in an edge area of the original image according to the change of the image edge information in the blurring processing procedure to obtain a sparse blur amount diagram; estimating the blur amounts of pixels in a non-edge area of the original image according to the parse blur amount diagram to obtain a complete blur amount diagram; and carrying out deblurring processing according to the complete blur amount diagram to obtain a deblurred image. In the method and device provided by the present invention; since a blur amount diagram is obtained based on the change of edge information after image blurting, the blur amount diagram can be more accurate, so that the quality of a deblurred image is improved.

DETAILED DESCRIPTION OF THE INVENTION

The present invention will become apparent from the following detailed description of embodiments and from the accompanying drawings.

Embodiment 1

Figure 1:
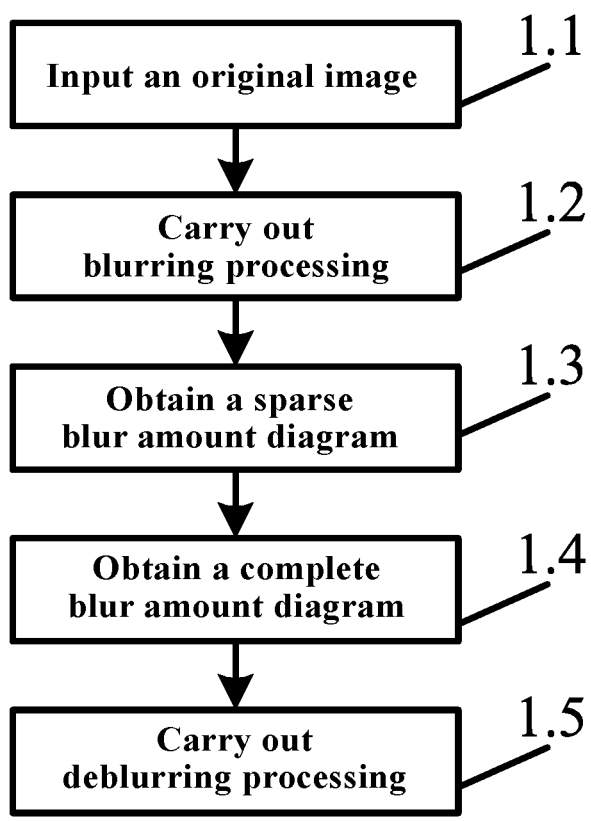
FIG. 1 is a flowchart for a method of deblurring an out-of-focus blurred image according to one embodiment in the present invention.

Referring to FIG. 1, a deblurring method for an out-of-focus blurred image includes the following steps:

Step 1.1: inputting an original image. The original image is a single depth-based spatial variable out-of-focus blurred image.

Step 1.2: using a preset blur kernel to carry out blurring processing on the original image to obtain a re-blurred image.

In the current example, the input original image is re-blurred by a Gaussian kernel (a preset blur kernel) having a standard deviation $\sigma_0$ (blur amount).

It should be noted that, according to one embodiment of the present invention, the blur kernel of out-of-focus blurred image is taken as a Gaussian model to describe the present invention. According to other embodiments, if the blur kernel of out-of-focus blurred image is taken as another model (for example, a disc model), the deblurring method provided in the present invention is also applicable.

Step 1.3: estimating the blur amounts of pixels in an edge area of the original image according to the change of the image edge information in the blurring processing procedure in Step 1.2 to obtain a sparse blur amount diagram.

The edge of the original image can be expressed as:

$$f(x,y)=Au(x,y)+B \tag{3}$$

where u(x,y) is a step function, A and B denote amplitude and offset, respectively. The coordinates at the edge of the image are (x,y)=(0,0).

According to the present embodiment, the edge sharpness is defined as:

$$S = \frac{|\nabla I| - |\nabla I_R|}{|\nabla I| + \varepsilon} \tag{4}$$

$|\nabla I|$ and $|\nabla I_R|$ are the gradient values of the original image and the re-blurred image (to get the gradient of the image, take the image as a 2D discrete function and derive the 2D discrete function), and $\varepsilon$ is a very small positive number used to prevent zero denominator, and $|\nabla I|=\sqrt{\nabla_x I^2 + \nabla_y I^2}$, $|\nabla I_R|=\sqrt{\nabla_x I_R^2 + \nabla_y I_R^2}$.

The greater the S is, the greater the sharpness of the edge is. Using S we can deduce $\sigma$.

The gradient $\nabla I_R$ of the re-blurred image can be denoted by the following convolution process:

$$|\nabla I_R(x,y)| = |\nabla((Au(x,y)+B) \otimes k(x,y,\sigma) \otimes k(x,y,\sigma_0))| \tag{5}$$
$$= \frac{1}{\sqrt{2\pi(\sigma^2+\sigma_0^2)}} e^{-\frac{x^2+y^2}{2(\sigma^2+\sigma_0^2)}}$$

Since $\varepsilon$ is far less than $|\nabla I|$, it is negligible in the process of deriving $\sigma$, so formula (4) can be written as:

$$S = 1 - \sqrt{\frac{\sigma^2}{\sigma^2+\sigma_0^2}} e^{\frac{x^2+y^2}{2\sigma^2} - \frac{x^2+y^2}{2(\sigma^2+\sigma_0^2)}} \tag{6}$$

According to the present embodiment, the edge detection is performed by using the Canny operator, and (x,y)=(0,0) at the edge, so $$S = 1 - \sqrt{\frac{\sigma^2}{\sigma^2+\sigma_0^2}} \tag{7}$$

We can get the blur amounts $\sigma$ by formula (7):

$$\sigma = \sqrt{\frac{(1-S)^2 \sigma_0^2}{2S - S^2}} \tag{8}$$

The blur amounts $\sigma$ corresponding to each pixel form a sparse blur diagram.

Due to the noise at small edges, the estimation of $\sigma$ is inaccurate. Preferably, a sparse blur amount diagram is corrected first. According to the present embodiment, a Guided filter method is used to correct the sparse blur amount diagram. Take the edge image as the guide image. The corrected image r is:

$$r_i = \Sigma_j W_{ij}(E) \sigma_j \tag{9}$$

where i and j are pixel indices, E is an edge image, W is a kernel function, and $$W_{ij}(E) = \frac{1}{|w|^2} \sum_{z:(i,j) \in w_z} \left(1 + \frac{(E_i - \mu_z)(E_j - \mu_z)}{\delta_z^2 + \zeta}\right), \quad (10)$$

$w_z$ is the window centered at pixel z, $\mu_z$, $\delta_z^2$ and $|w|$ are the average of the pixel gray scale in window $w_z$, the variance and the total number of pixels in window $w_z$ in E, respectively, and $\zeta$ is a regularization parameter. According to the present embodiment, the window $w_z$ and $\zeta$ are set to be 5×5 and $10^{-9}$, respectively.

And if $r_t < 10^{-8}$, let $r_t = 0$.

Step 1.4: estimating the blur amounts of pixels in a non-edge area of the original image according to the sparse blur amount diagram to obtain a complete blur amount diagram.

The sparse blur amount diagram only includes the blur amounts of pixels in an edge area, and therefore, the blur amounts of pixels in both edge areas and non-edge areas shall be obtained.

According to the present embodiment, the blur amounts of pixels in a non-edge area of the original image are estimated according to the sparse blur amount diagram by using a KNN matting interpolation method to obtain a complete blur amount diagram.

Specially, the complete blur amount diagram can be obtained by the following formula:

$$E(\hat{m}) = \hat{m}^T(L+\lambda D)\hat{m} - 2\lambda \hat{r}^T \hat{m} + \lambda |\hat{r}|, \quad (11)$$

where $\hat{m}$ and $\hat{r}$ denote the vectors of the complete blur amount diagram and the sparse blur amount diagram, respectively. $\lambda$ is a regularization parameter, D=diag($\hat{r}$), L is the Laplace matrix of sparse correlation matrix A, and T is a transposed matrix. For pixel i, find k most adjacent pixels j in the feature space, set A (i, j) as g (i, j) and set other values as zero. The kernel function g (i, j) is defined as:

$$g(i, j) = 1 - \frac{\|X(i) - X(j)\|}{C} \quad (12)$$

where X(i) is the feature vector computed with adjacent pixels around i; C is the minimum upper bound of $\|X(i)-X(f)\|$, such that $g(i,j) \in [0,1]$. The optimal solution of $\hat{m}$ can be obtained by the following expression:

$$(L+\lambda D)\hat{m} = \lambda \hat{r} \quad (13)$$

Specially, $\lambda$ can be set as 0.8, and $\hat{m}$ is constrained by $\hat{r}$. The $\hat{m}$ in (13) is solved by the Preconditioned Conjugate Gradient (PCG) method.

Step 1.5: carrying out deblurring processing according to the obtained complete blur amount diagram to obtain a deblurred image. Step 1.5 may adopt any deblurring method in the prior art, such as using the two deblurring methods in the prior art of the present invention.

According to the present embodiment, considering that the sharpness and contrast of the edge reduces due to out-of-focus, the blur amounts generated at the high frequency will have a relatively large change. Therefore, a preset blur kernel is used to carry out blurring processing on an input original image, and to estimate the blur amounts of pixels in an edge area of the original image according to the change of the image edge information. In this way, the blur amount diagram can be more accurate, and the deblurred image is clearer.

Embodiment 2

It can be seen from the above analysis that the blur degree is related to the depth of the image. The higher the depth is, the higher the blur degree is. For most of the scenes with variable depth, the depth of the pixels of the same object can be regarded as locally similar, that is, the blur degree also has local consistency. However, in the complete blur amount diagram obtained by the prior art or the method provided in Embodiment 1, the blur amounts of each pixel is different. In order to ensure the local consistency of blur kernels and reduce the influence of the abnormal value, the image is divided into a plurality of superpixels by using the superpixel segmentation method, and the blur amounts of superpixels are obtained according to the blur amounts of all pixels in each superpixel.

Figure 2:
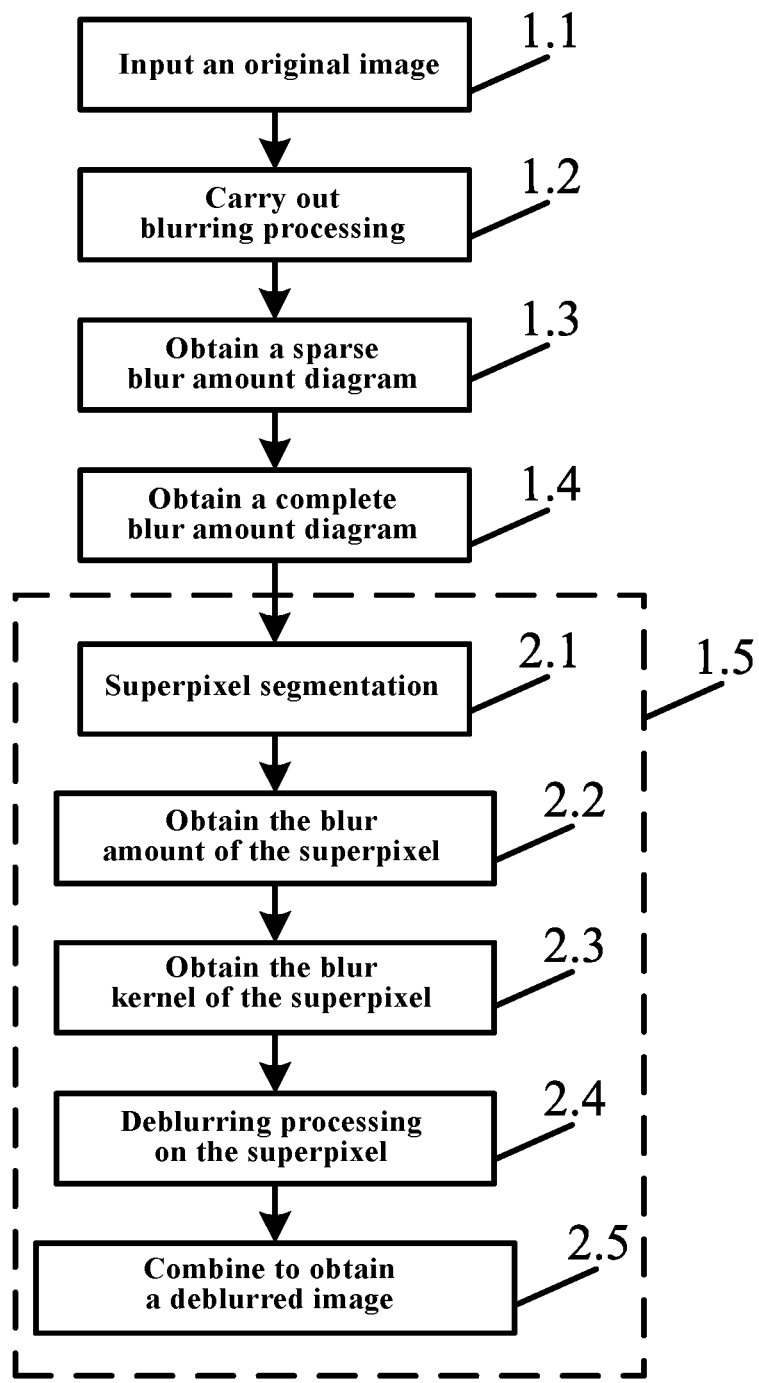
FIG. 2 is a flowchart for a method of deblurring an out-of-focus blurred image according to another embodiment in the present invention.

FIG. 2 illustrates a deblurring method for an out-of-focus blurred image according to the present embodiment, which differs from Embodiment 1 in that Step 1.5 includes the following steps:

Step 2.1: dividing the complete blur amount diagram into a plurality of superpixels by using the superpixel segmentation method.

Step 2.2: processing the blur amounts of all pixels in the current superpixel to obtain the blur amount of the current superpixel.

According to the present embodiment, the average of the blur amounts a of all pixels in each superpixel is used as the blur amount of the superpixel, that is:

$$\sigma_n = \frac{\sum_{j \in M_n} m_j}{t}, n \in [1, l] \quad (14)$$

where n is a superpixel label, $\sigma_n$ and $m_j$ are the blur amount of the $n^{th}$ superpixel and the blur amount of the pixel j, respectively. $M_n$ denotes the $n^{th}$ superpixel area and t is the number of pixels in $M_n$. The total number l of superpixels is a preset parameter.

According to other embodiments, the blur amounts of superpixels can also be determined in other ways according to the actual situation.

Step 2.3: obtaining the blur kernel of each superpixel according to the blur amount of the superpixel.

Specially, the blur kernel of the $n^{th}$ superpixel is:

$$k_n(x, y, \sigma_n) = \frac{1}{\sqrt{2\pi} \sigma_n} e^{-\frac{x^2+y^2}{2\sigma_n^2}}, n \in [1, l] \quad (15)$$

Step 2.4: carrying out deblurring processing on each superpixel according to the blur kernel of the superpixel.

Specially, carry out deblurring processing on each superpixel according to the blur kernel of each superpixel, comprising the steps of: performing deconvolution calculation on each superpixel according to the blur kernel of the superpixel, respectively. According to the present embodiment, deblurring processing is carried out on each superpixel according to the blur kernel of the superpixel by using a non-blind deconvolution method based on 3D Block Matching (BM3D). The image restored by using BM3D-based deconvolution method has less noise and retains details.

Step 2.5: combining all deblurred superpixels to obtain a deblurred image.

Specially, the finally obtained deblurred image is:

$$L = \sum_{n=1}^{l} \tilde{L}_n(x, y) \qquad (16)$$

Where $$\tilde{L}_n(x, y) = \begin{cases} \tilde{L}_n(x, y) & (x, y) \in M_n \\ 0 & \text{Other} \end{cases} \qquad (17)$$

$L_n$ is the image restored by using the blur kernel $k_n$ (the $n^{th}$ superpixel).

According to the present embodiment, use a superpixel segmentation method to carry out deblurring processing on each superpixel and then combine all superpixels to obtain a clear image. We can change the spatial variable deblurring processing to the local spatial consistent deblurring processing. The superpixel-based image segmentation method can better adapt to scene depth changes and edge areas of the image, and can distinguish the foreground from the background more accurately, complying with the depth consistency. Compared with the method of dividing the image into rectangular areas with equal size to carry out blur kernel estimation, and the method of dividing the blur amounts into different scales, the method provided in this embodiment can obtain more accurate blur kernel based on the blur amount diagram of local consistent depth.

Embodiment 3

In most cases, the deblurred image obtained by the methods provided in Embodiment 2 may have ringing artifacts and noise, especially in the edge area of the image. There are two main reasons for this situation. The first is that the parameter l is too small, resulting in oversized superpixel areas after segmentation, which contain areas with large changes in depth. The second is that the blur amount a at the smaller edge is smaller than the blur amount $\sigma_n$ of the current superpixel.

Figure 3:
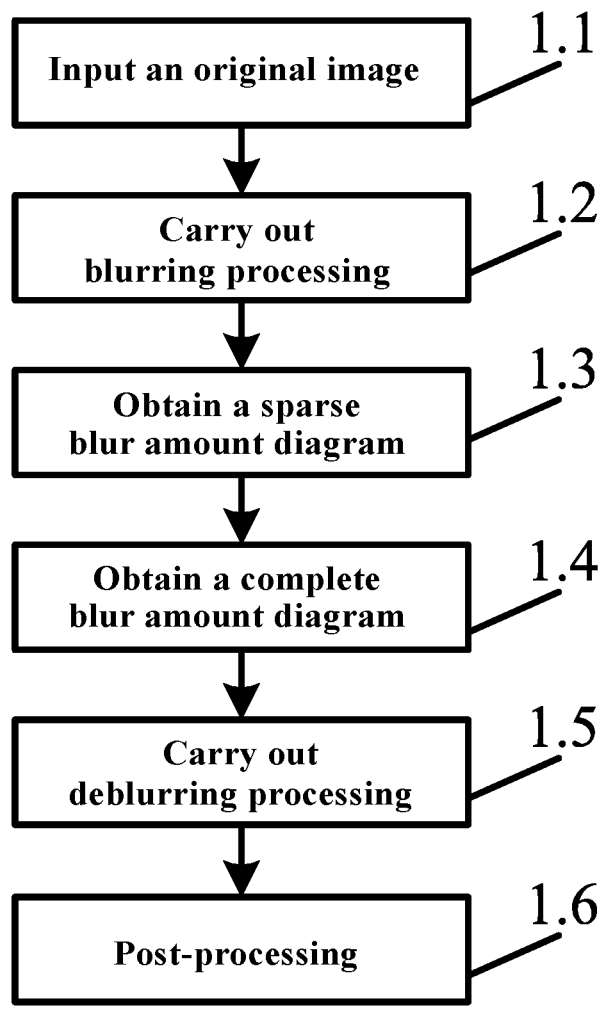
FIG. 3 is a flowchart for a method of deblurring an out-of-focus blurred image according to another embodiment in the present invention.

Referring to FIG. 3, in order to solve this problem, the present embodiment provides another deblurring method for an out-of-focus blurred image, which differs from Embodiment 1 and Embodiment 2 in that after Step 1.5, this method further comprises Step 1.6: carrying out post-processing on the deblurred image to obtain a final clear image.

Figure 4:
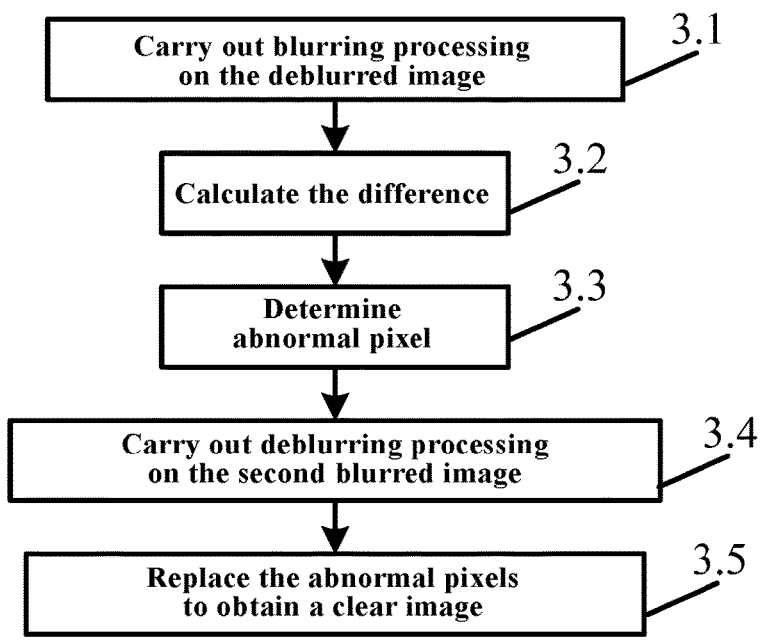
FIG. 4 is a flowchart of post-processing in a method of deblurring an out-of-focus blurred image according to one embodiment in the present invention.

Referring to FIG. 4, according to the present embodiment, the post-processing includes the following steps:

Step 3.1: carrying out blurring processing on the deblurred image according to the obtained blur kernel of each superpixel to obtain the second blurred image.

Step 3.2: calculating the difference e(x, y) between the area in the second blurred image and the corresponding area in the original image, specially:

$$e(x,y)=|\tilde{L}_n(x,y) \otimes k_n(x,y,\sigma_n)-I(x,y)|, (x,y) \in M_n \qquad (17)$$

Step 3.3: determining the corresponding pixel as an abnormal pixel when the difference obtained is greater than the preset threshold τ.

Step 3.4: using the minimum value of the blur amounts of all pixels in the superpixel, which contains the abnormal pixel as the blur amount of the superpixel, and carry out deblurring processing on the second blurred image according to the blur amount to obtain the restored image.

Step 3.5: replacing the corresponding pixels in the deblurred image with the restored result of the abnormal pixels in the restored image to obtain the final clear image.

According to the present embodiment, if e(x, y) is greater than the preset threshold τ, the pixel (x, y) is considered as an abnormal pixel. If $\sigma_n$ is greater than the blur amount $m_j$ of the pixel j, ringing artifacts or noise may occur. Therefore, use the minimum value of the blur amounts in each superpixel in m as the blur amount of the superpixel to carry out image restoration (carry out deblurring processing on the second blurred image) to obtain the restored image $\overline{L}_n$. Replace the abnormal pixels (ringing artifacts and noise pixels) in $L_n$ with the pixels in $\overline{L}_n$ to obtain the clear image finally:

$$L_f(x, y) = \begin{cases} \tilde{L}(x, y) & e(x, y) \le \tau \\ \overline{L}(x, y) & e(x, y) > \tau \end{cases} \qquad (18)$$

Specially, according to the present embodiment, the parameters in the following table may be used. In other embodiments, these parameters may adopt corresponding empirical values or be selected according to actual needs.

| $\sigma_0$ | ε | τ | λ | ζ |
|---|---|---|---|---|
| 3 | $10^{-6}$ | $8*10^{-4}$ | 0.8 | $10^{-9}$ |

A deblurring method for an out-of-focus blurred image is provided in the embodiment to obtain a clear image with higher quality and free of ringing artifacts or noise.

Embodiment 4

Figure 5:
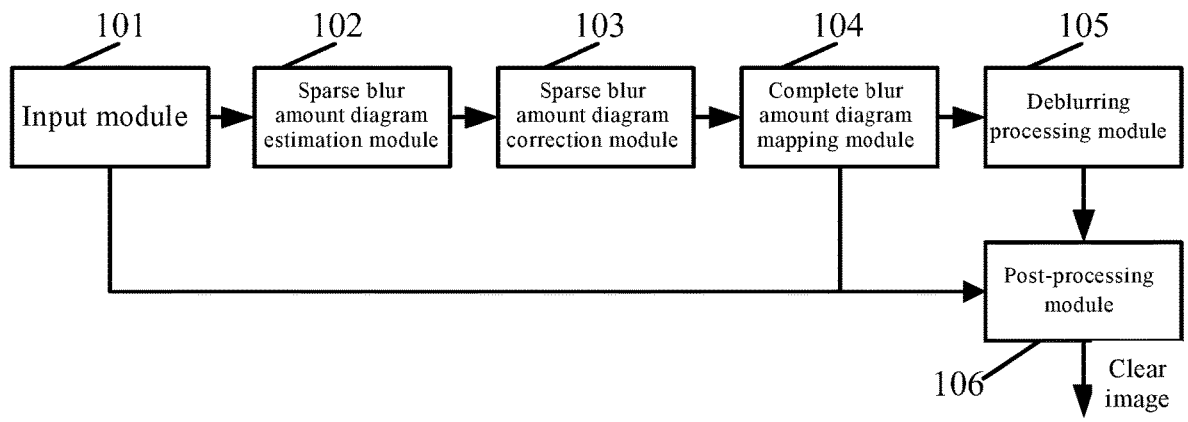
FIG. 5 is a schematic view of a device for deblurring an out-of-focus blurred image according to one embodiment in the present invention.

Referring to FIG. 5, based on a deblurring method for an out-of-focus blurred image provided in the above three embodiments, this embodiment provides a deblurring device for an out-of-focus blurred image, comprising an input module 101, a sparse blur amount diagram estimation module 102, a sparse blur amount diagram correction module 103, a complete blur amount diagram mapping module 104, a deblurring processing module 105, and a post-processing module 106.

The input module 101 inputs an original image.

The sparse blur amount diagram estimation module 102 can use a preset blur kernel to carry out blurring processing on the original image to obtain a re-blurred image, and estimate the blur amounts of pixels in an edge area of the original image according to the change of the image edge information in the blurring processing procedure to obtain a sparse blur amount diagram.

The complete blur amount diagram mapping module 104 can estimate the blur amounts of pixels in a non-edge area of the original image according to the sparse blur amount diagram to obtain a complete blur amount diagram.

The deblurring processing module 105 can carry out deblurring processing according to the complete blur amount diagram to obtain a deblurred image.

In some embodiments, the deblurring device for an out-of-focus blurred image can further include a sparse blur amount diagram correction module 103 can correct the sparse blur amount diagram, and a complete blur amount diagram mapping module 104 can estimate the blur amounts of pixels in a non-edge area of the original image according to the corrected sparse blur amount diagram to obtain a complete blur amount diagram.

Specially, the sparse blur amount diagram correction module 103 can correct the sparse blur amount diagram by using a Guided filter method. The complete blur amount diagram mapping module 104 can estimate the blur amounts of pixels in a non-edge area of the original image according to the sparse blur amount diagram by interpolation to obtain a complete blur amount diagram.

According to the present embodiment, the sparse blur amount diagram estimation module 102 can estimate the blur amounts of pixels in an edge area of the original image according to the change of the image edge information in the blurring processing procedure to obtain a sparse blur amount diagram, and the blur amount a of pixels in an edge area is given by the following formula.

$$\sigma \sqrt{\frac{(1-S)^2 \sigma_0^2}{2S - S^2}}$$

where S is the sharpness of the edge, $\sigma_0$ is the blur amount of the preset blur kernel; and $$S = \frac{|\nabla I| - |\nabla I_R|}{|\nabla I| + \varepsilon}$$

where $|\nabla I|$ and $|\nabla I_R|$ are the gradient values of the original image and the re-blurred image, respectively, and $\varepsilon$ is a preset positive value.

Figure 6:
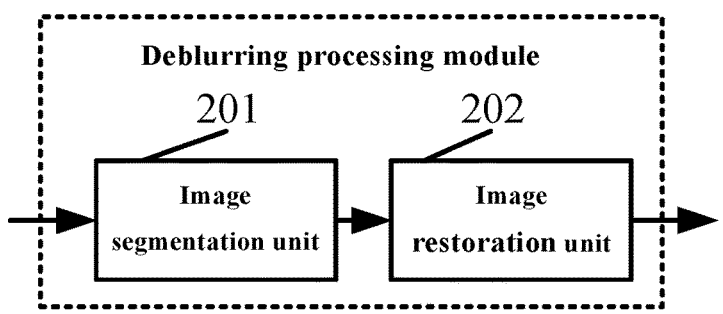
FIG. 6 is a schematic view of a deblurring processing module in a device for deblurring an out-of-focus blurred image according to one embodiment in the present invention.

Further, referring to FIG. 6, the deblurring processing module can include an image segmentation unit 201 and an image restoration unit 202.

The image segmentation unit 201 can divide the complete blur amount diagram into a plurality of superpixels by using the superpixel segmentation method.

The image restoration unit 202 can process the blur amounts of all pixels in the current superpixel to obtain the blur amount of the current superpixel; obtaining the blur kernel of each superpixel according to the blur amount of the superpixel; carrying out deblurring processing on each superpixel according to the blur kernel of the superpixel, and combining all deblurred superpixels to obtain a deblurred image.

Specially, the image restoration unit 202 can use the average of the blur amounts of all pixels in the current superpixel as the blur amount of the current superpixel.

The image restoration unit 202 can perform deconvolution calculation on each superpixel according to the blur kernel of each superpixel. According to the present embodiment, the image restoration unit 202 can carry out deblurring processing on each superpixel according to the blur kernel of each superpixel by using a non-blind deconvolution method based on 3D Block Matching (BM3D).

In some embodiments, the deblurring device for an out-of-focus blurred image can further include a post-processing module 106 can carry out post-processing on the deblurred image to obtain a final clear image.

According to the present embodiment, the post-processing module 106 can carry out blurring processing on the deblurred image according to the obtained blur kernel of each superpixel to obtain the second blurred image; calculating the difference between the area in the second blurred image and the corresponding area in the original image; determining the corresponding pixel as an abnormal pixel when the difference obtained is greater than the preset threshold; using the minimum value of the blur amounts of all pixels in the superpixel which contains the abnormal pixel as the blur amount of the superpixel, and carrying out deblurring processing on the second blurred image according to the blur amount to obtain the restored image; and replacing the corresponding pixels in the deblurred image with the restored result of the abnormal pixels in the restored image to obtain the final clear image.

The deblurring device for an out-of-focus blurred image provided in this embodiment corresponds to deblurring method for an out-of-focus blurred image provided in Embodiment 3. For specific implementation method, refer to Embodiment 3, which is not described in detail in this embodiment.

A deblurring device for an out-of-focus blurred image is provided by the present embodiment to obtain more accurate blur amount diagram, more accurate blur kernel based on the blur amount diagram of local consistent depth, and a clearer image with higher quality and free of ringing artifacts or noise It is understood by those skilled in the field that all or part of steps of various methods according to the embodiments may be programmed to instruct the associated hardware to achieve the goals, which may be stored in a readable storage medium of computer, e.g. read-only memory, random access memory, disk or CD.

The above contents are further detailed description of the present invention in connection with the disclosed embodiments. The invention is not limited to the embodiments referred to, but may be varied and modified by those skilled in the field without departing from the conception and scope of the present invention.

What is claimed is:

1. A method of deblurring an out-of-focus blurred image, comprising:
   inputting an original image;
   using a preset blur kernel to carry out blurring processing on the original image to obtain a re-blurred image;
   estimating blur amounts of pixels in an edge area of the original image according to a change in image edge information in the blurring processing procedure to obtain a sparse blur amount diagram;
   estimating blur amounts of pixels in a non-edge area of the original image according to the sparse blur amount diagram to obtain a complete blur amount diagram; and
   carrying out deblurring processing according to the complete blur amount diagram to obtain a deblurred image, wherein the step of carrying out deblurring processing further comprises:
      dividing the complete blur amount diagram into a plurality of superpixels by using superpixel segmentation method, and processing the blur amounts of all pixels a current superpixel to obtain a blur amount of the current superpixel:
      obtaining a blur kernel of each superpixel according to a blur amount of each superpixel; and
      carrying out deblurring processing on each superpixel according to the blur kernel of each superpixel, and combining all deblurred superpixels to obtain the deblurred image.

2. The method of claim 1, wherein the sparse blur amount diagram is corrected first, and then the blur amounts of pixels in a non-edge area of the original image are estimated according to the corrected sparse blur amount diagram to obtain a complete blur amount diagram.

3. The method of claim 2, wherein the sparse blur amount diagram is corrected by using a Guided filter method.

4. The method of claim 1, wherein the blur amounts of pixels in a non-edge area of the original image are estimated according to the sparse blur amount diagram by using a KNN matting interpolation method to obtain a complete blur amount diagram.

5. The method of claim 1, wherein in the step of estimating the blur amounts of pixels in an edge area of the original image according to the change of the image edge information in the blurring processing procedure, the blur amounts σ of pixels in an edge area is given by the following formula:

$$\sigma \sqrt{\frac{(1-S)^2 \sigma_0^2}{2S - S^2}}$$

where S is the sharpness of an edge, and $\sigma_0$ is the blur amount of the preset blur kernel; and $$S = \frac{|\nabla I| - |\nabla I_R|}{|\nabla I| + \varepsilon}$$

where $|\nabla I|$ and $\nabla I_R|$ are gradient values of the original image and the re-blurred image, respectively, and E is a preset positive value.

6. The method of claim 1, wherein the blur amounts of all pixels in the current superpixel are processed to obtain the blur amount of the current superpixel, which comprises: using the average of the blur amounts of all pixels in the current superpixel as the blur amount of the current superpixel.

7. The method of claim 1, wherein deblurring processing is carried out on each superpixel according to the blur kernel of each superpixel, which comprises: performing deconvolution calculation on each superpixel according to the blur kernel of each superpixel.

8. The method of claim 7, wherein deblurring processing is carried out on each superpixel according to the blur kernel of each superpixel by using a non-blind deconvolution method based on 3D Block Matching (BM3D).

9. The method of claim 1, wherein it further comprises carrying out post-processing on the deblurred image to obtain a final clear image.

10. The method of claim 9, wherein the step of carrying out deblurring processing further comprises:
   carrying out blurring processing on the deblurred image according to the blur kernel of each superpixel to obtain a second blurred image;
   calculating a difference between an area in the second blurred image and a corresponding area in the original image;
   determining a corresponding pixel as an abnormal pixel when the difference is greater than a preset threshold;
   using the minimum value of the blur amounts of all pixels in the superpixel which contains the abnormal pixel as the blur amount of the superpixel, and carrying out deblurring processing on the second blurred image according to the blur amount to obtain a restored image; and
   replacing corresponding pixels in the deblurred image with a restored result of abnormal pixels in the restored image to obtain the final clear image.

11. A device for deblurring an out-of-focus blurred image, comprising:
   an input module configured to input an original image;
   a sparse blur amount diagram estimation module configured to use a preset blur kernel to carry out blurring processing on the original image to obtain a re-blurred image, and to estimate blur amounts of pixels in an edge area of the original image according to a change of image edge information in the blurring processing to obtain a sparse blur amount diagram;
   a complete blur amount diagram mapping module configured to estimate blur amounts of pixels in a non-edge area of the original image according to the sparse blur amount diagram to obtain a complete blur amount diagram; and
   a deblurring processing module configured to carry out deblurring processing according to the complete blur amount diagram to obtain a deblurred image, wherein the deblurring processing module comprises:
      an image segmentation unit configured to divide the complete blur amount diagram into a plurality of superpixels by using a superpixel segmentation method; and
      an image restoration unit configured to process blur amounts of all pixels in a current superpixel to obtain a blur amount of the current superpixel, to obtain a blur kernel of each superpixel according to a blur amount of the superpixel, to carry out deblurring processing on each superpixel according to the blur kernel of each superpixel, and to combine all deblurred superpixels to obtain the deblurred image.

12. A device according to claim 11, wherein further comprising:
   a sparse blur amount diagram correction module configured to correct the sparse blur amount diagram; and
   a complete blur amount diagram mapping module configured to estimate the blur amounts of pixels in a non-edge area of the original image according to the corrected sparse blur amount diagram to obtain a complete blur amount diagram.

13. A device according to claim 12, wherein the sparse blur amount diagram correction module is configured to correct the sparse blur amount diagram by using a Guided filter method.

14. A device according to claim 11, wherein the complete blur amount diagram mapping module is configured to estimate the blur amounts of pixels in a non-edge area of the original image according to the sparse blur amount diagram by using a KNN matting interpolation method to obtain a complete blur amount diagram.

15. A device according to claim 11, wherein the sparse blur amount diagram estimation module is configured to estimate the blur amounts of pixels in an edge area of the original image according to the change of the image edge information in the blurring processing procedure to obtain a sparse blur amount diagram, wherein the blur amounts σ of pixels in an edge area is given by the following formula:

$$\sigma \sqrt{\frac{(1-S)^2 \sigma_0^2}{2S - S^2}}$$

where S is the sharpness of an edge, $\sigma_0$ is the blur amount of the preset blur kernel; and $$S = \frac{|\nabla I| - |\nabla I_R|}{|\nabla I| + \varepsilon}$$

where $|\nabla I|$ and $|\nabla I_R|$ are gradient values of the original image and the re-blurred image, respectively, and E is a preset positive value.

16. A device according to claim 15, wherein the image restoration unit is configured to use the average of the blur amounts of all pixels in the current superpixel as the blur amount of the current superpixel.

17. A device according to claim 15, wherein the image restoration unit is configured to perform deconvolution calculation on each superpixel according to the blur kernel of each superpixel.

18. A device according to claim 17, wherein the image restoration unit is configured to carry out deblurring processing on each superpixel according to the blur kernel of the superpixel by using a non-blind deconvolution method based on 3D Block Matching (BM3D).

19. A device according to claim 15, further comprising:
a post-processing module configured to carry out post-processing on the deblurred image to obtain a final clear image.

20. A device according to claim 19, wherein the post-processing module is configured to
carry out blurring processing on the deblurred image according to the blur kernel of each superpixel to obtain a second blurred image;
to calculate a difference between an area in the second blurred image and a corresponding area in the original image;
to determine a corresponding pixel as an abnormal pixel when a difference is greater than a preset threshold;
to use the minimum value of the blur amounts of all pixels in the superpixel which contains the abnormal pixel as the blur amount of the superpixel, and carrying out deblurring processing on the second blurred image according to the blur amount to obtain a restored image; and
to replace corresponding pixels in the deblurred image with a restored result of abnormal pixels in the restored image to obtain the final clear image.

\* \* \* \* \*